United States Patent [19]

Miller

[11] 3,826,995

[45] July 30, 1974

[54] FREQUENCY GENERATORS

[75] Inventor: William Francis Miller, Chelmsford, England

[73] Assignee: The Marconi Company Limited, Chelmsford, Essex, England

[22] Filed: Oct. 30, 1972

[21] Appl. No.: 301,976

[30] Foreign Application Priority Data

Oct. 28, 1971 Great Britain .................... 50107/71

[52] U.S. Cl. .................................... 331/38, 331/43
[51] Int. Cl. .......................................... H03b 21/02
[58] Field of Search .................... 331/38, 40, 43, 39

[56] References Cited

UNITED STATES PATENTS

| | | | |
|---|---|---|---|
| 2,445,664 | 7/1948 | Doelz | 331/38 |
| 3,069,631 | 12/1962 | Adams | 331/38 X |
| 3,119,078 | 1/1964 | Stone, Jr. | 331/38 |

*Primary Examiner*—Ronald L. Wibert
*Assistant Examiner*—Richard A. Rosenberger
*Attorney, Agent, or Firm*—Baldwin, Wight & Brown

[57] ABSTRACT

A frequency generator produces a comb-like spectrum of frequencies, each of the frequencies being derived from a single standard frequency. A relatively small number of predetermined frequencies are derived directly from the standard frequency and arranged in groups. Thereafter all frequencies in each group are mixed with all frequencies in all other groups to produce the required comb-like frequency spectrum. The invention permits a large number of frequencies to be accurately derived from a single frequency in a practicable and economical manner.

6 Claims, 6 Drawing Figures

FREQUENCY GENERATORS improvements

Figure 1:
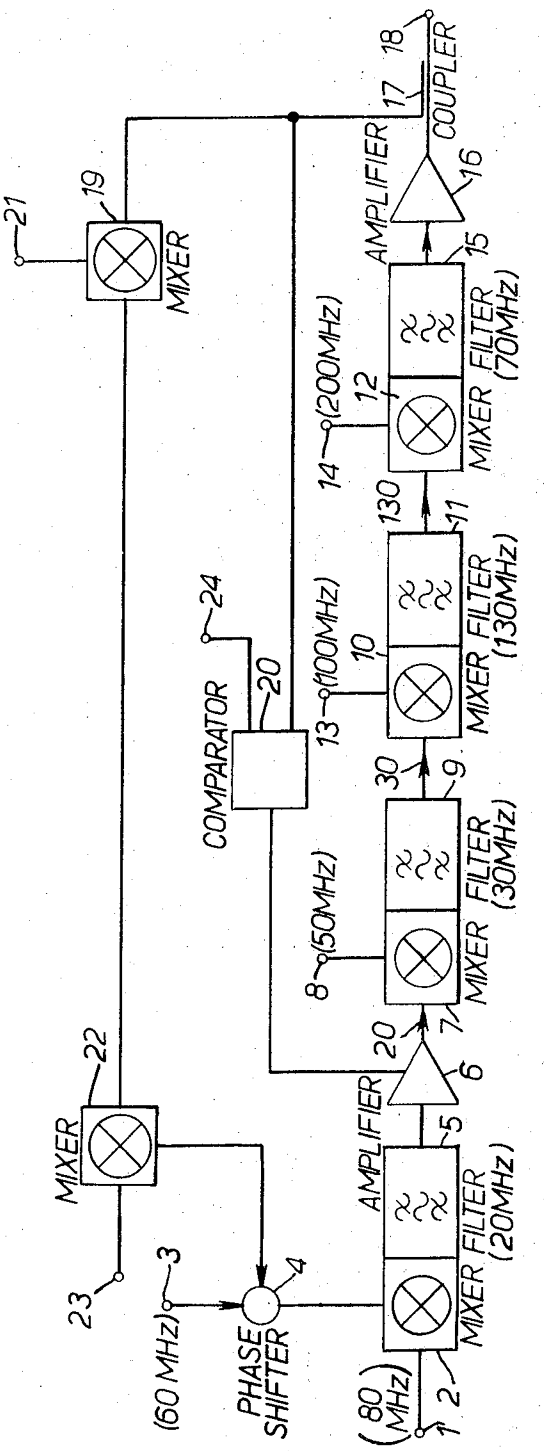

This invention relates to frequency generators and more specifically to frequency generators which produce a comb-like spectrum of frequencies. It is becoming increasingly necessary to provide frequency generators which produce simultaneously a large number of frequencies, for example, a hundred or more, each frequency having a precisely predetermined value. The difficulties in producing a comb-like frequency spectrum the properties of which are accurate and consistent are severe and this invention seeks to provide an improved frequency generator of this kind.

According to this invention a frequency generator for generating a comb-like spectrum of frequencies includes means for generating a plurality of different groups of frequencies, each group containing a plurality of different frequencies, and means for mixing all frequencies in each group of frequencies with all frequencies in all other groups of frequencies to produce a plurality of frequencies which together constitute the comb-like spectrum of frequencies and which are equal in number to the product of the numbers of frequencies in each of said groups of frequencies which are so mixed.

It is usual, for practical reasons, to mix only two frequencies together in any one individual mixer, and preferably each mixer is provided with a frequency selective filter which eliminates unwanted harmonics.

Where only two frequencies are mixed together in any one mixer preferably the frequency produced as a result of mixing together two frequencies from two different groups is mixed with one frequency from yet another group, and the resulting frequency mixed with another frequency from yet another group until a frequency from all groups has been mixed in this way.

Where it is necessary to provide a coherent phase relationship between all frequencies in the comb-like spectrum of frequencies, all frequencies in all the different groups of frequencies are preferably derived from a single source of frequency. Preferably again this single source of frequency is a stable crystal controlled oscillator.

In one embodiment in accordance with this invention each of the frequencies in the comb-like spectrum of frequencies is synthesized in a different frequency synthesizing channel, each channel including in a serial path, a first mixer followed by a first band-pass filter, and a plurality of second mixers each followed by a band-pass filter, the number of second mixers being equal to the number of said different groups of frequencies.

Preferably a controllable-gain amplifier is present in the said path between the said first pass-band filter and the plurality of second mixers. Preferably again the amplitude of an output frequency resulting from the said plurality of second mixers is compared with an amplitude reference signal and the gain of the controllable-gain amplifier controlled in dependence on the result of this comparison to provide an output frequency having a desired amplitude.

Preferably there is present in an input path of the first mixer a controllable phase shifter, which is controlled in dependence on the phase of the output frequency.

Preferably again the said channels are arranged to produce a comb-like spectrum of frequencies in which the frequencies are regularly spaced; the frequency difference between all pairs of adjacent frequency values being the same.

Preferably the frequency output of each channel in a pair of channels providing outputs having adjacent frequency values is coupled to a mixer, this mixer being arranged to provide a difference frequency equal to the difference in frequencies applied to it, and said difference frequency being applied to a further mixer to which is also applied a reference frequency equal to the nominal value of the difference frequency, said further mixer being arranged to provide an output signal representative of the phase difference between the two frequencies applied to it, and said representative signal being used to control the said controllable phase shifter so as to reduce the said phase difference.

Figure 2:
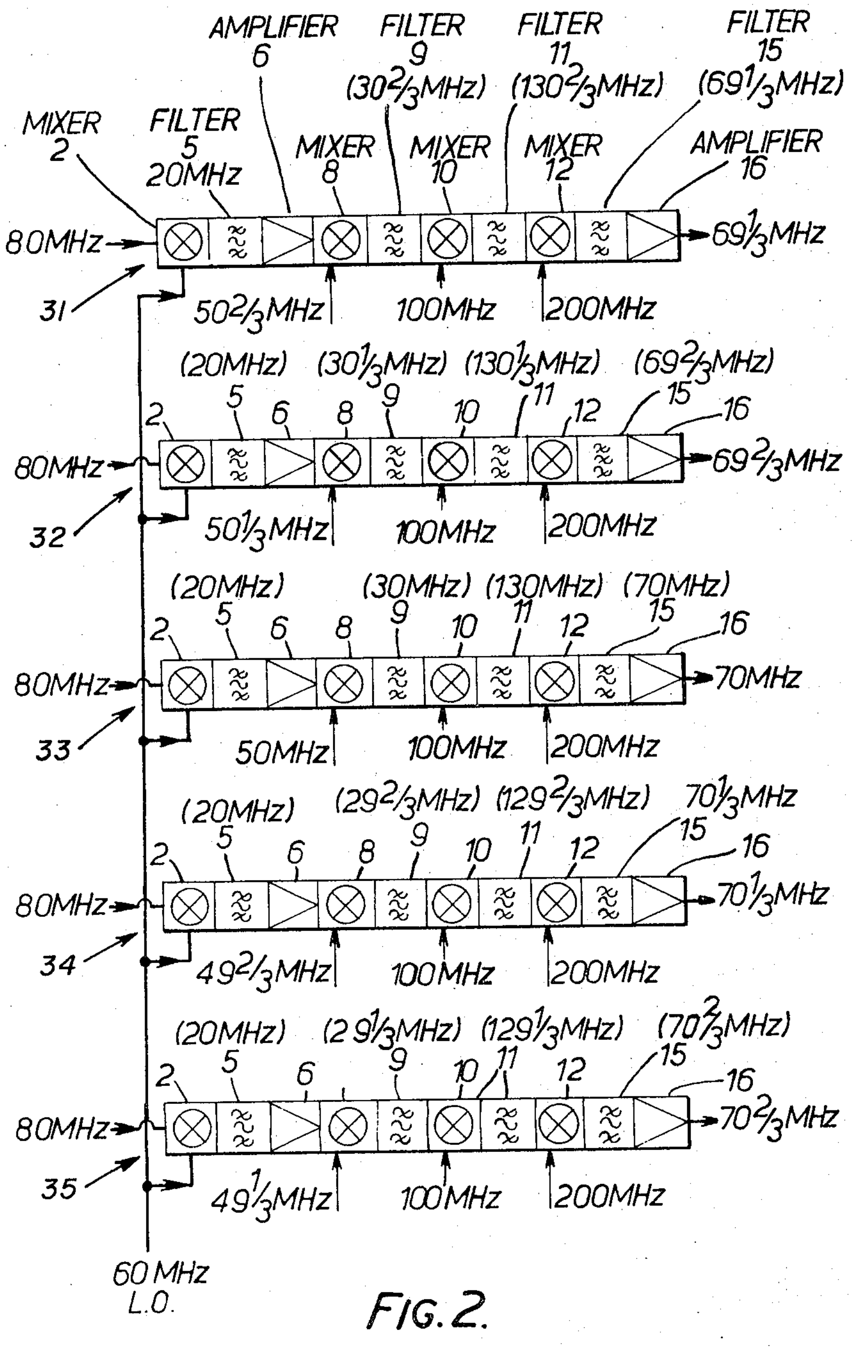
Figure 3:
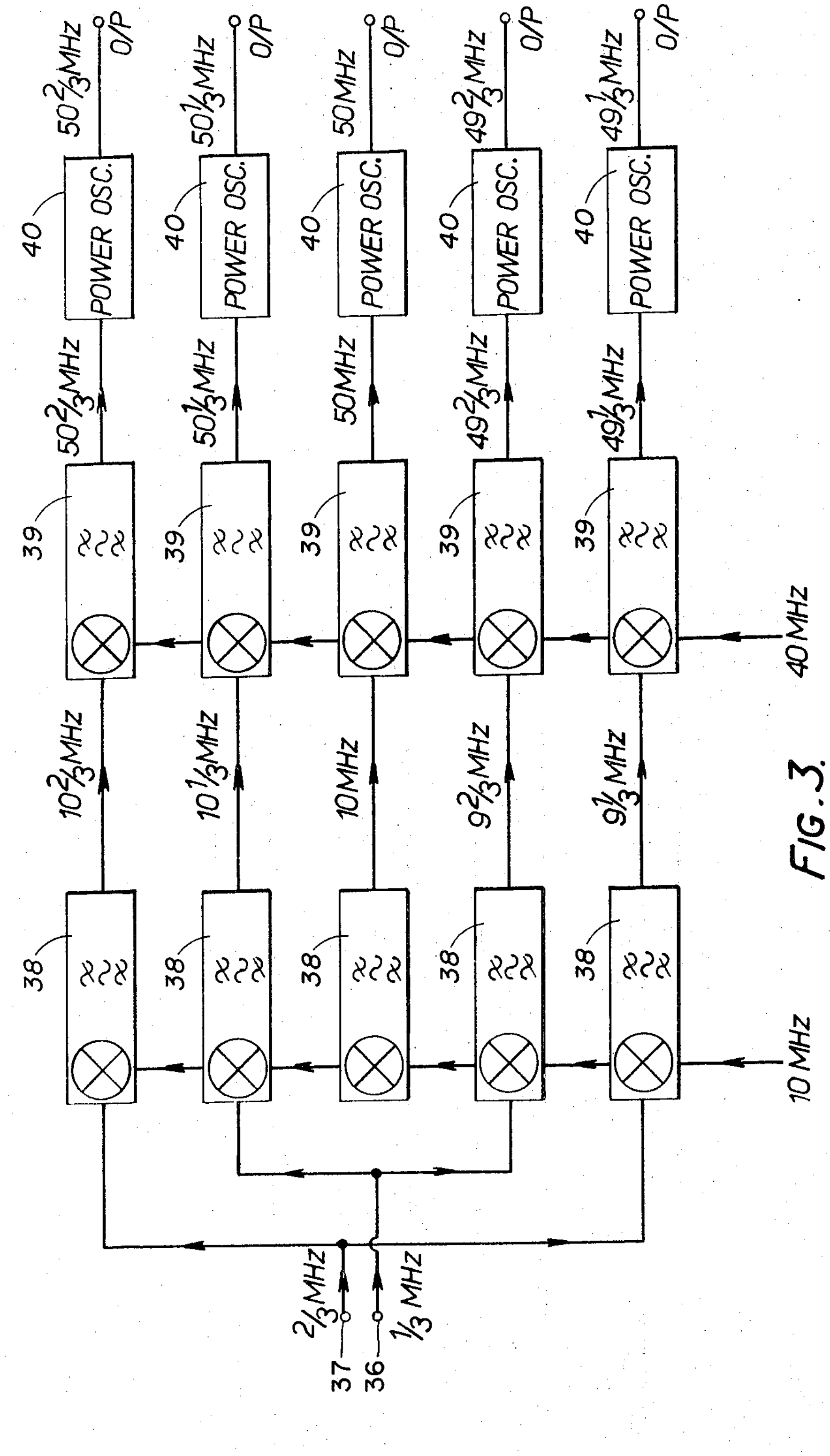
Figure 4:
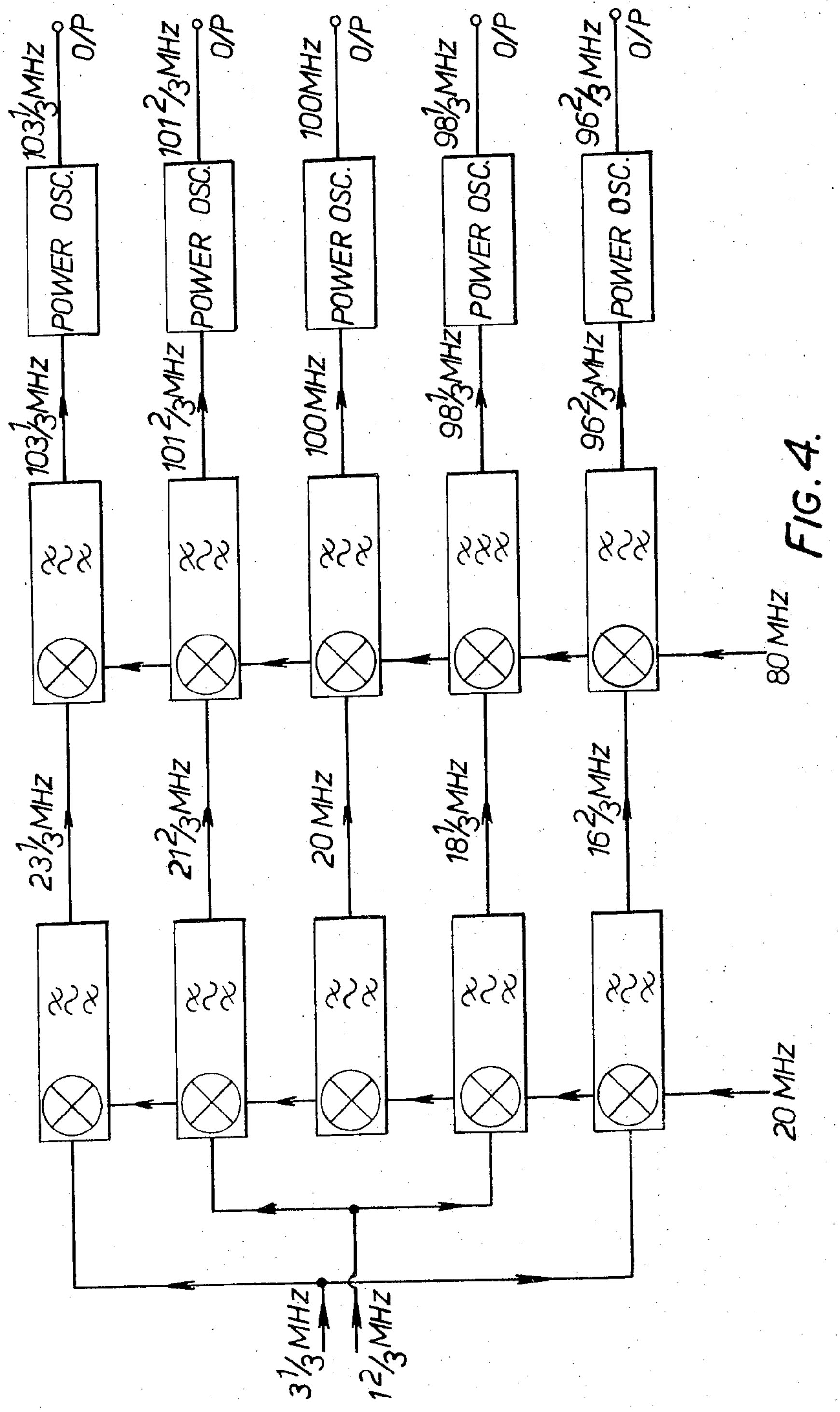
Figure 5:
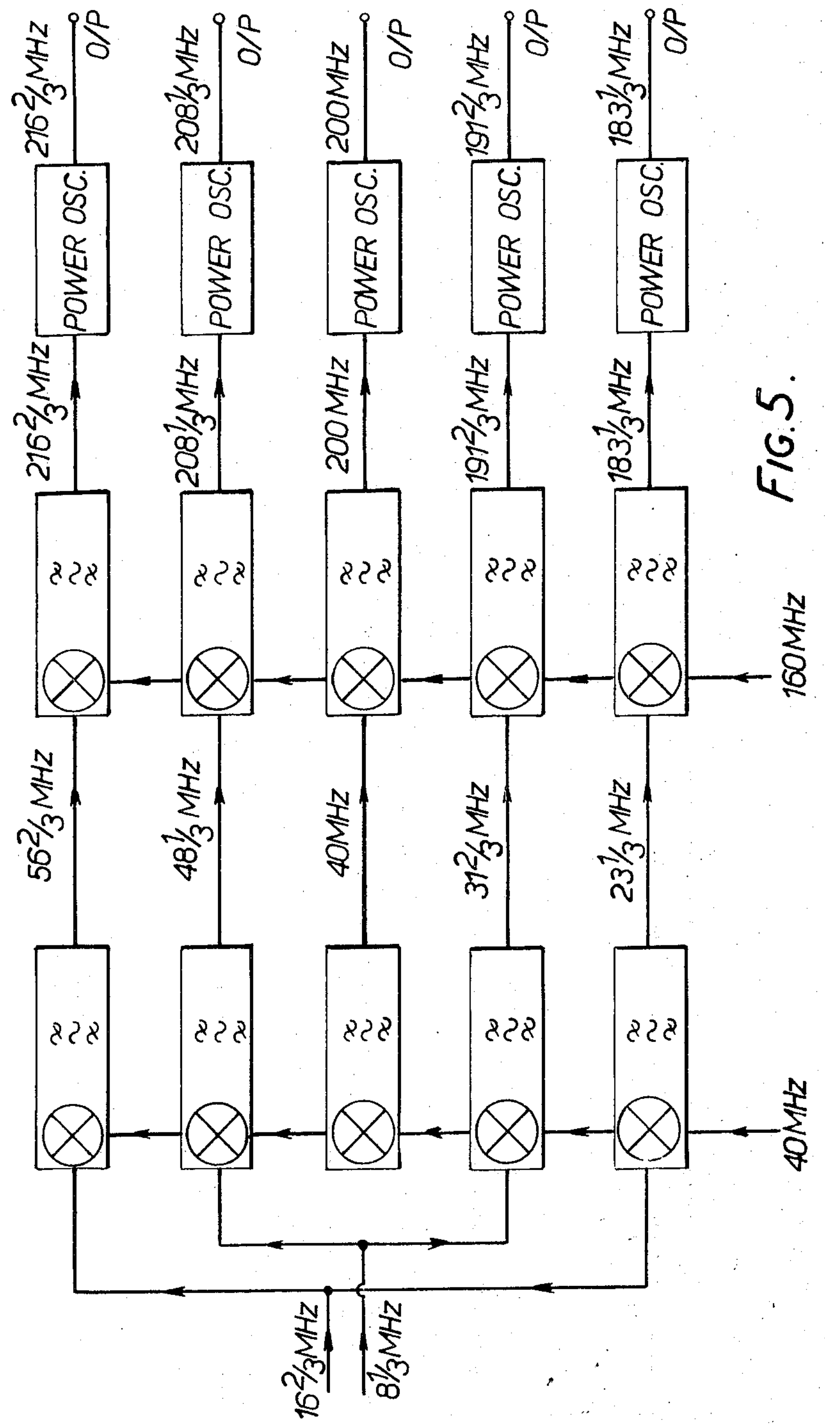
Figure 6:
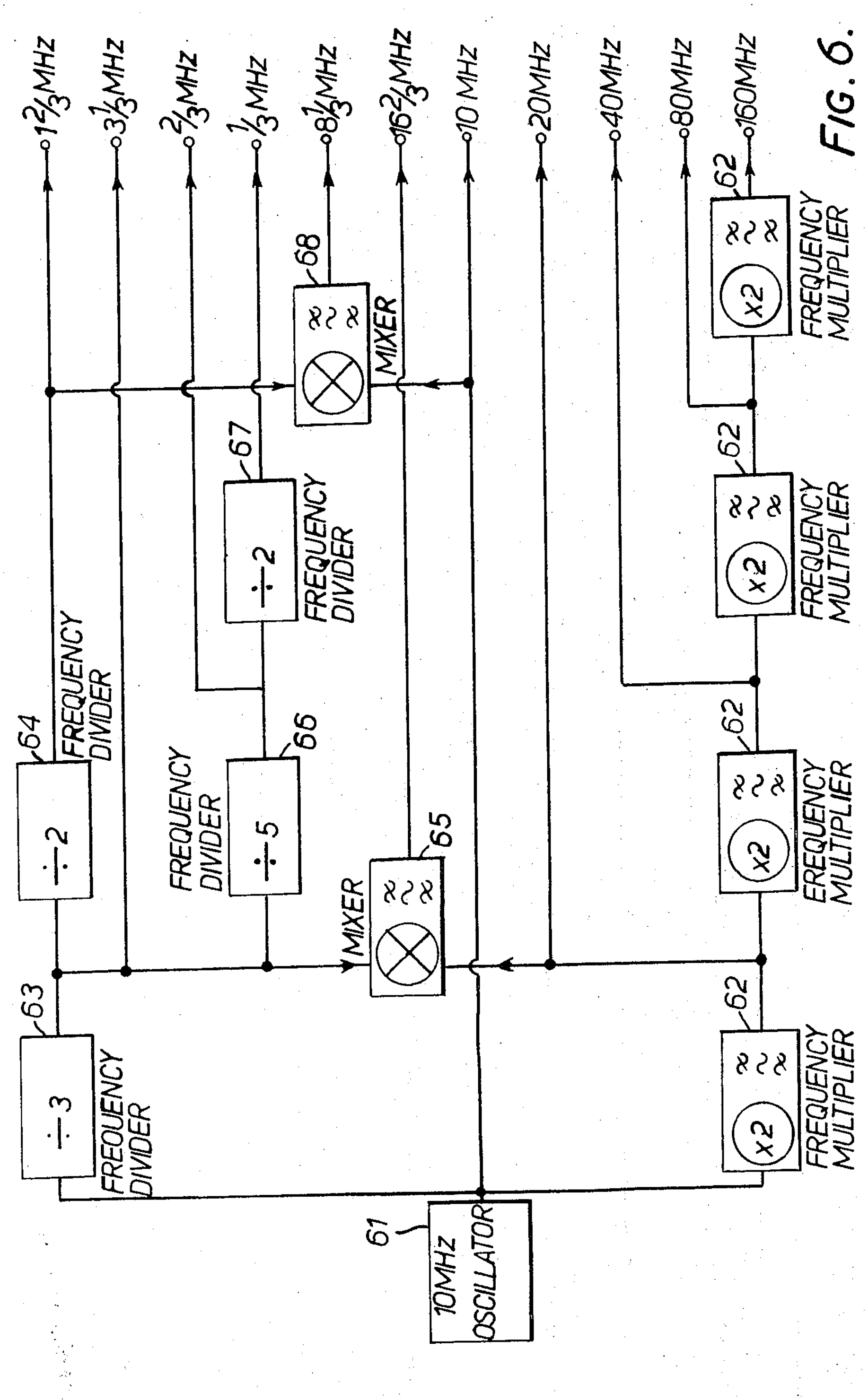

The invention will be further described, by way of example, with reference to the accompanying drawings in which FIG. 1 shows in diagrammatic form the generation of a single output frequency, FIG. 2 shows in diagrammatic form the generation of a number of output frequencies, FIGS. 3, 4 and 5 show in diagrammatic form the generation of certain frequencies for use in connection with FIGS. 1 and 2, and FIG. 6 shows in diagrammatic form the generation of certain frequencies for use in connection with FIGS. 3, 4 and 5.

The drawings illustrate the generation of a regular comb-like frequency spectrum having 125 discrete frequencies extending from 49⅓ MHz to 90⅔ MHz in steps of one-third MHz.

Referring to FIG. 1 there is shown therein a single frequency synthesizing channel. The complete frequency generator includes 125 such channels, one for each output frequency. A fixed frequency of 80 MHz is applied via a terminal 1 to a first mixer 2, to which is also applied via a terminal 3 and a controllable phase shifter 4 a fixed frequency of 60 MHz. The two frequencies are mixed in the mixer 2 and the resultant is passed through a narrow band filter 5 which passes only the difference frequency of 20 MHz. The frequency of 20 MHz is passed via a controllable-gain amplifier 6 to a further mixer 7 where it is mixed with a frequency applied to a terminal 8. The frequency applied to the terminal 8 could have one of five values, i.e., 49⅓ MHz, 49⅔ MHz, 50 MHz, 50⅓ MHz or 50⅔ MHz. These frequencies are termed herein Group I frequencies.

Output from mixer 7 is passed via a filter 9 to a further mixer 10 where it is mixed with one of five frequencies which constitute Group II frequencies. The output of mixer 10 is passed via a filter 11 to a final mixer 12 where it is mixed with one of five frequencies which constitute Group III frequencies. Group II frequencies are applied via terminal 13 and consist of 96⅔ MHz, 98⅓ MHz, 100 MHz, 101⅔ MHz and 103⅓ MHz. Group III frequencies are applied via terminal 14 and consist of 183⅓ MHz, 191⅔ MHz, 200 MHz, 208⅓ MHz and 216⅔ MHz. Output from mixer 12 is passed via a filter 15, an amplifier 16, and a coupler 17 to an output terminal 18. The coupler 17 is connected to a mixer 19 and one input of a comparator 20. Terminal 21 is also connected to the mixer 19, and in operation terminal 21 would be coupled to the output point of an adjacent synthesizing channel. Output from the mixer 19 is connected to a mixer 22, which is also fed via a terminal 23 with a frequency of one-third MHz. The output of the mixer 22 is connected to control the controllable phase shifter 4. Comparator 20 is also fed with a d.c. reference voltage applied via a terminal 24 and the output of the comparator 20 is used to control the gain of the amplifier 6.

As already stated, there are provided 125 channels each like the channel shown in FIG. 1. For each channel, terminal 8 is connected to one of the five Group I frequencies, terminal 13 is connected to one of the five Group II frequencies, and terminal 14 is connected to one of the five Group III frequencies. To consider a specific case it is assumed that frequencies of 50 MHz, 100 MHz and 200 MHz are applied to terminals 8, 13 and 14 respectively, and that filters 5, 9, 11 and 15 are narrow band pass filters and are arranged to pass frequencies of 20 MHz, 30 MHz, 130 MHz and 70 MHz respectively.

It will thus be apparent that the various mixing and filter stages produce an output of 70 MHz. This output is coupled to the mixer 19 where it is mixed with the output from an adjacent channel (which provides an output frequency of either 69⅔ MHz or 70⅓ MHz) to provide a difference frequency of one-third MHz which is fed to mixer 22. Mixer 22 is fed, via terminal 23, with the reference frequency equal to one-third MHz, and as a result a d.c. signal is produced, which is used to control the controllable phase shifter 4 to bring the output of mixer 19 into exact phase with ⅓ MHz reference frequency.

In order to control the output amplitude, the output signal is coupled via the coupler 17 to the comparator 20 where it is compared with a reference signal applied via the terminal 24. In practice the reference signal could be a d.c. voltage level, and in this case the coupled output signal would be smoothed prior to comparison.

Referring now to FIG. 2, there is shown therein five channels of the kind shown in FIG. 1, like parts having the same references as in FIG. 1, and the channels being referenced 31 to 35. For the sake of clarity the phase, and amplitude control circuits have been omitted from this drawing. All channels are fed with the 80 MHz and the 60 MHz frequencies which are mixed in mixer 2. In the five channels shown the Group II frequency of 100MHz is unchanged and the Group III frequency of 200 MHz is unchanged, and each of the five Group I frequencies (50⅔ MHz, 50⅓ MHz, 50 MHz, 49⅔ MHz and 49⅓ MHz) is applied to channels 31 to 35 respectively to produce the five output frequencies 69⅓ MHz 69⅔ MHz, 70 MHz, 70⅓ MHz and 70⅔ MHz respectively. In the complete frequency generator under consideration there are 125 different channels, each producing a different one of the frequencies in the comb-like frequency spectrum referred to previously. The total number of different frequencies obtainable is the multiple of the different frequencies in the three groups I, II and III, i.e., $5 \times 5 \times 5 = 125$. It will thus be appreciated that the 125 frequencies have been obtained from only 15 frequencies. The frequencies of 80 MHz and 60 MHz are merely carriers and could be dispensed with if desired, although the use of the 60 MHz frequency provides a particularly convenient way of controlling the phase of the output frequencies. It will be realised that if, say, four groups of five frequencies were used then the 20 frequencies would be mixed to produce 625 different output frequencies.

In order that all of the output frequencies may be made phase coherent all of the frequencies are derived ultimately from a single 10 MHz crystal oscillator. The generation of the frequencies in groups I, II and III is shown in FIGS. 3, 4 and 5 respectively. In FIG. 3 a frequency of one-third MHz is applied to terminal 36 and a frequency of two-thirds MHz is applied to terminal 37. These frequencies are mixed with a 10 MHz frequency in mixers 38 which also include a filter tuned to the required mixed frequency to eliminate unwanted harmonics. The frequencies produced as a result of this mixing are passed to mixers 39 where they are mixed with a frequency of 40 MHz. After filtering the frequencies are passed to power oscillators 40. The frequencies obtained are clearly indicated on the drawing.

FIGS. 4 and 5 show in similar fashion the way in which the Group II and Group III frequencies are derived respectively. The operation of these circuits is analogous to that of FIG. 3 and it is not thought necessary to describe them in detail.

Referring to FIG. 6 there is shown therein the way in which all of the required frequencies are derived from a single 10 MHz crystal oscillator 61. Oscillator 61 feeds a series of frequency multipliers 62 each having a multiplication factor of two and each including a narrow band filter to remove unwanted harmonics. From these multipliers the frequencies of 20 MHz, 40 MHz, 80 MHz and 160 MHz are obtained. The oscillator 61 also feeds a divide-by-three frequency divider 63 which in turn feeds a divide-by-two frequency divider 64 from which the frequency of 1⅔ MHz is obtained. The frequency of 3⅓ MHz obtained from frequency divider 63 is fed both to a mixer 65, where it is mixed with the 20 MHz frequency obtained from frequency multiplier 62 to obtain a frequency of 16⅔ MHz, and to a divide-by-five frequency divider 66 which provides the frequency of two-thirds MHz. This frequency is passed through divide-by-two frequency divider 67 to obtain the frequency of one-third MHz. The frequency of 8⅓ MHz is obtained by mixing the frequencies of 1⅔ MHz and 10 MHz in mixer 68 which incorporates a suitable filter.

I claim:

1. A frequency generator system for simultaneously producing a large number of output signals each of a different frequency and cumulatively defining a comb-like spectrum of frequencies, comprising in combination:

means for generating a first group of different frequencies and including a stable oscillator;

means for generating from said first group of frequencies a plurality of further groups of different frequencies, the sum of said frequencies of said first and said further groups of frequencies being small in relation to said large number of output signals;

a plurality of mixing channels each including a first mixer and a plurality of serially connected second mixers, said first mixer of each channel being connected to a pair of frequencies of said first group and said second mixers of each channel being connected to a set of frequencies where each set comprises frequencies selected from each further group; and and of said frequencies being related to produce said comb-like spectrum of frequencies from said mixing channels in which the number of frequencies in said spectrum is large compared to said sum of frequencies;

each mixing channel also including a controllable phase shifter in an input path of the first mixer and controlled in dependence on the phase of such mixing channel relative to a reference signal from the first group of frequencies.

2. A generator as claimed in claim 1 wherein each first mixer is followed by a first band-pass filter, and said second mixers are each followed by a band-pass filter, the number of second mixers being equal to the number of said different groups of frequencies.

3. A generator as claimed in claim 1 wherein a controllable-gain amplifier is present in the said path between the said first pass-band filter and the plurality of second mixers.

4. A generator as claimed in claim 3 wherein the amplitude of an output frequency resulting from the said plurality of second mixers is compared with an amplitude reference signal and the gain of the controllable-gain amplifier controlled in dependence on the result of this comparison to provide an output frequency having a desired amplitude.

5. A generator as claimed in claim 1 wherein the said channels are arranged to produce a comb-like spectrum of frequencies in which the frequencies are regularly spaced; the frequency difference between all pairs of adjacent frequency values being the same.

6. A generator as claimed in claim 5 wherein the frequency output of each channel in a pair of channels providing outputs having adjacent frequency values is coupled to a mixer, this mixer being arranged to provide a difference frequency equal to the difference in frequencies applied to it, and said difference frequency being applied to a further mixer to which is also applied a reference frequency equal to the nominal value of the difference frequency, said further mixer being arranged to provide an output signal representative of the phase difference between the two frequencies applied to it, and said representative signal being used to control the said controllable phase shifter so as to reduce the said phase difference.

* * * * *